(12) United States Patent
Arai et al.

(10) Patent No.: US 6,454,068 B2
(45) Date of Patent: Sep. 24, 2002

(54) POWER TRANSMITTING SYSTEM FOR FOUR-WHEEL DRIVE VEHICLE

(75) Inventors: Kentaro Arai; Ryuichi Murakami; Susumu Takahashi; Yasunori Arai, all of Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 52 days.

(21) Appl. No.: 09/770,386

(22) Filed: Jan. 29, 2001

(30) Foreign Application Priority Data

Feb. 7, 2000 (JP) ........................................ 2000-034357

(51) Int. Cl.[7] ........................ B60K 17/35; F16D 43/286
(52) U.S. Cl. ................ 192/35; 192/85 CA; 192/103 F; 180/247
(58) Field of Search ................................ 192/35, 54.52, 192/85 CA, 103 F; 180/233, 247

(56) References Cited

U.S. PATENT DOCUMENTS

| 4,899,859 A | * | 2/1990 | Teraoka .................. 180/237 X |
| 5,201,820 A | * | 4/1993 | Hamada et al. ............. 180/233 |
| 5,221,101 A | * | 6/1993 | Okubo et al. ............... 180/247 |
| 5,244,056 A | * | 9/1993 | Hamada et al. ............. 180/247 |
| 5,469,950 A | * | 11/1995 | Lundstrom et al. ...... 192/103 F |
| 6,158,561 A | * | 12/2000 | Sakai et al. .................... 192/35 |

FOREIGN PATENT DOCUMENTS

JP 2516095 4/1996

* cited by examiner

Primary Examiner—Richard M. Lorence
(74) Attorney, Agent, or Firm—Armstrong, Westerman & Hattori, LLP

(57) ABSTRACT

A four-wheel drive vehicle having a first hydraulic pump operated in operative association with the rotation of front wheels, and a second hydraulic pump operated in operative association with the rotation of rear wheels, such that a difference in rotational speed is produced between the front and rear wheels, a multi-plate clutch is brought into its engaged state by a hydraulic pressure generated by the hydraulic pumps, whereby the mode of the vehicle is shifted into a four-wheel drive mode. A torque cam mechanism is disposed between a clutch piston and clutch plates, so that when the difference in rotational speed is produced between the front and rear wheels, the torque cam mechanism produces an axial thrust force immediately to promptly bring the multi-plate clutch into its engaged state. The engagement of the multi-plate clutch is achieved with a sufficient engagement force by the hydraulic pressure thereafter produced by the hydraulic pump.

3 Claims, 7 Drawing Sheets

POWER TRANSMITTING SYSTEM FOR FOUR-WHEEL DRIVE VEHICLE

BACKGROUND OF THE INVENTION

1. Field of the Invention

The present invention relates to a four-wheel drive vehicle including front wheels to which a driving force from an engine is transmitted directly, and rear wheels to which a portion of the driving force from the engine is transmitted indirectly through a multi-plate clutch which is brought into its engaged state by a hydraulic pressure generated by a difference between rotational speeds of the front and rear wheels.

2. Description of the Related Art

There is a conventional power transmitting system already proposed by the present assignees in Japanese Patent No. 2516095, wherein, whenever the front wheels are slipped to produce a difference between the rotational speeds of the front and rear wheels, a driving force is transmitted from the front wheels to the rear wheels to automatically switch over the mode of the vehicle from a two-wheel drive mode to a four-wheel drive mode.

The conventional system is designed such that when a difference in rotational speed is produced between the front and rear wheels, a hydraulic pressure is generated by a difference between the amount of oil discharged from a first hydraulic pump operated in operative association with the rotation of the front wheel and the amount of oil discharged from a second hydraulic pump operated in operative association with the rotation of the rear wheels, and such hydraulic pressure causes the multi-plate clutch to be brought into its engaged state, thereby transmitting the driving force from the front wheels to the rear wheels to switch over the mode of the vehicle to the four-wheel drive mode. However, the conventional system suffers from a disadvantage in that there is a time lag until the multi-plate clutch is brought into the engaged state by the hydraulic pressure generated based on the difference between the rotational speeds of the front and rear wheels. Another disadvantage is that, whenever the forward movement of the vehicle is initiated, the front wheels are slipped, resulting in a low responsiveness for bringing the vehicle into the four-wheel drive mode.

SUMMARY OF THE INVENTION

The present invention has been derived with the above circumstance in view, and it is an object of the present invention to ensure that in a four-wheel drive vehicle designed so that a multi-plate clutch is brought into its engaged state by a hydraulic pressure based on a difference between rotational speeds of front and rear wheels, the responsiveness from the generation of the difference between the rotational speeds of the front and rear wheels to the shifting of the vehicle into the four-wheel drive mode is enhanced.

To achieve the above object, there is provided a power transmitting system for a four-wheel drive vehicle including front wheels to which a driving force from an engine is transmitted directly, and rear wheels to which a portion of the driving force from the engine is transmitted indirectly through a multi-plate clutch, the multi-plate clutch being brought into its engaged state by a hydraulic pressure generated by hydraulic pumps in accordance with a difference between rotational speeds of the front wheels and the rear wheels. The power transmitting system comprises a torque cam mechanism including a first cam member operated in operative association with the rotation of the front wheels, and a second cam member operated in operative association with the rotation of the rear wheels, the multi-plate clutch being brought into the engaged state by an axial thrust force generated in accordance with a difference between the rotational speeds of the cam members, the torque cam mechanism being arranged so that when the rotational speed of the front wheels is greater than that of the rear wheels during forward traveling of the vehicle, the thrust force is generated, and when the rotational speed of the rear wheels is greater than that of the front wheels during forward traveling of the vehicle, the thrust force is not generated.

With the above arrangement, when the rotational speed of the front wheels is greater than that of the rear wheels during forward traveling of the vehicle, the first cam member and the second cam member of the torque cam mechanism are rotated relative to each other to generate the thrust force, thereby immediately bringing the multi-plate clutch into the engaged state. Therefore, as soon as the front wheels are slipped upon starting of the forward movement of the vehicle or during sudden acceleration of the vehicle moved forwards to generate the difference between the rotational speeds, the driving force is transmitted from the front wheels to the rear wheels. Thus, it is possible to enhance the responsiveness for bringing the vehicle into the four-wheel drive mode to enhance the running performance. Thereafter, the multi-plate clutch is brought into the engaged state by the hydraulic pressure generated by the hydraulic pumps with a small time lag and, hence, a sufficient amount of driving force transmitted from the front wheels to the rear wheels can be ensured. On the other hand, when the rotational speed of the rear wheels is greater than that of the front wheels due to a sudden braking during forward traveling of the vehicle, the torque cam mechanism generates no thrust force. Therefore, it is possible to prevent the driving force from being transmitted from the front wheels to the rear wheels to avoid interference with an ABS system or the like.

One of the first cam member and the second cam member may be connected through a frictional clutch to a member rotated in operative association with one of the front wheels and the rear wheels.

With the above arrangement, one of the first cam member and the second cam member is connected through a frictional clutch to a member rotated in operative association with one of the front wheels and the rear wheels. Therefore, the moment that the relative rotations of the front and rear wheels are produced, the first cam member and the second cam member can be rotated relative to each other to generate the thrust force. Before the multi-plate clutch is thereafter brought into the completely engaged state by the hydraulic pressure, the frictional clutch can be slipped to prevent an excessive load from being applied to the torque cam mechanism.

The member rotated in operative association with the front wheels and the first cam member are connected to each other through the frictional clutch, and the second cam member is fixed to the member rotated in operative association with the rear wheels, so that a hydraulic pressure generated by the hydraulic pumps urges the entire torque cam mechanism axially through an end plate to bring the multi-plate clutch into the engaged state, and a thrust bearing is disposed between the end plate and the first cam member at a location radially inward from an urging portion of the second cam member for urging the multi-plate clutch.

With the above arrangement, the thrust bearing is disposed between the end plate and the first cam member.

Therefore, the relative rotations of the end plate rotated in operative association with the front wheels and the first cam member rotated in operative association with the rear wheels after the operation of the torque cam mechanism can be absorbed. Moreover, the thrust bearing is disposed at a location radially inward from the urging portion of the second cam member for urging the multi-plate clutch and hence, the position of the thrust bearing can be displaced radially inwards as much as possible to alleviate the load and to enhance the durability.

DETAILED DESCRIPTION OF THE PREFERRED EMBODIMENTS

The present invention will now be described by way of embodiments of the present invention shown in the accompanying drawings.

FIGS. 1 to 5 show a first embodiment of the present invention.

Figure 1:
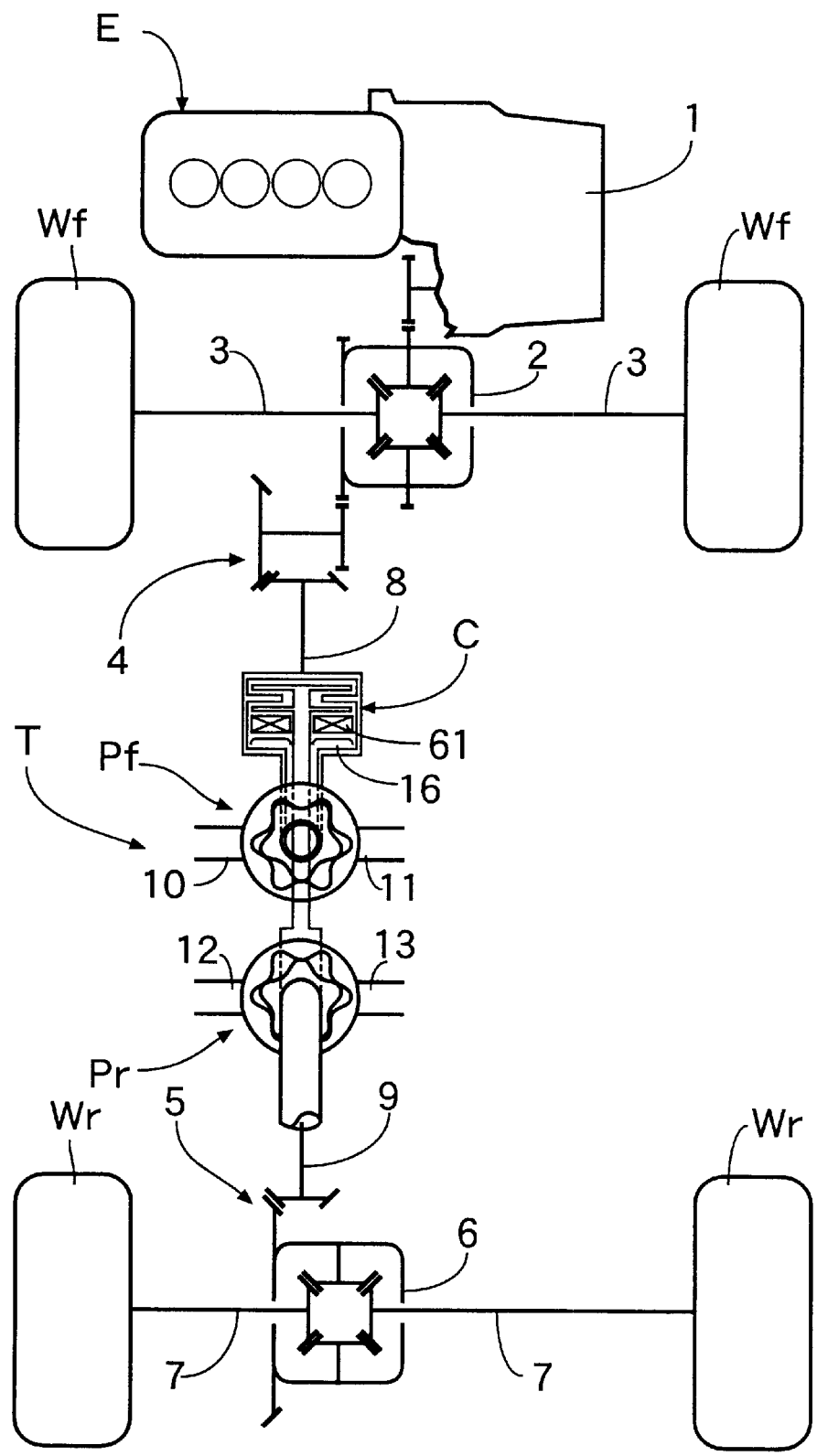
FIG. 1 is an illustration showing a power transmitting system in a four-wheel drive vehicle.

As shown in FIG. 1, an output from an engine E mounted at a front portion of a four-wheel drive vehicle is input into a differential 2 through a transmission 1 for front wheels, and an output from the differential 2 is transmitted through drive shafts 3, 3 to left and right front wheels Wf, Wf. The output transmitted from the engine E to the differential 2 is input into a power transmitting device T which will be described hereinafter through a bevel gear device 4, and an output from the power transmitting device T is transmitted through a bevel gear device 5 to a differential 6 for rear wheels. Further, an output from the differential 6 is transmitted through drive shafts 7, 7 to left and right rear wheels Wr, Wr.

The power transmitting device T is comprised of a first hydraulic pump Pf driven by an input shaft 8 extending the bevel gear device 4 for the front wheels, a second hydraulic pump Pr driven by an output shaft 9 connected to the bevel gear device 5 for the rear wheels, a wet-type multi-plate clutch C which governs the transmission and the interruption of a driving force between the input shaft 8 and the output shaft 9, and a hydraulic pressure circuit (which will be described hereinafter) for controlling the multi-plate clutch C.

The arrangements of the multi-plate clutch and the hydraulic pressure circuit will be described below with reference to FIGS. 2 and 3. The first hydraulic pump Pf comprises a trochoidal pump, and includes a first port 10 which acts as a discharge port during forward movement of the vehicle and acts as an intake port during reverse movement of the vehicle, and a second port 11 which acts as an intake port during forward movement of the vehicle and acts as a discharge port during reverse movement of the vehicle. The second hydraulic pump Pr likewise comprises a trochoidal pump, and includes a third port 12 which acts as an intake port during forward movement of the vehicle and acts as a discharge port during reverse movement of the vehicle, and a fourth port 13 which acts as a discharge port during forward movement of the vehicle and acts as an intake port during reverse movement of the vehicle. The amounts of oil discharged per one rotation by the hydraulic pumps Pf and Pr are set such that the amount of oil discharged by the second hydraulic pump Pr is slightly (for example, 2.5%) greater than the amount of oil discharged by the first hydraulic pump Pf. The first and second ports 10 and 12 are connected to each other through a first connecting oil passage 14, and the third and fourth ports 11 and 13 are connected to each other through a second connecting oil passage 15. The direction of oil discharged by each of the hydraulic pumps Pf and Pr each comprising the trochoidal pump depends on the rotational direction of the pump and hence, is inverted between forward and backward movements of the vehicle. Arrows in the hydraulic pumps Pf and Pr in FIG. 2 indicate directions of oil discharged during the forward movement of the vehicle.

The multi-plate clutch C includes a clutch housing 41 secured to the input shaft 8, and a clutch hub 42 secured to the output shaft 9, which is coaxially and relatively rotatably fitted in a rear end of the input shaft 8 with a roller bearing 29 interposed therebetween. A plurality of clutch plates 43 slidably carried in a spline 41a defined around an inner periphery of the clutch housing 41 and a plurality of clutch plates 44 slidably carried in a spline 42a defined around an outer periphery of the clutch hub 42 are superposed on one another, so that they can be put into abutment against one another. A clutch piston 47 is slidably received in a clutch cylinder 46 defined in a casing 45 with seal members 48, 48 interposed therebetween, and a working hydraulic pressure chamber 16 is defined on a right side of the clutch piston 47, so that a hydraulic oil for driving the clutch piston 47 is supplied into the working hydraulic pressure chamber 16.

A torque cam mechanism 61 disposed at a rear end of the multi-plate clutch C comprises a first cam member 62, a second cam member 63 and a plurality of cam balls 64. The first cam member 62 located on a rear side is a substantially annular member, and is relatively non-rotatably and axially movably carried at its outer peripheral portion in a rear portion of the spline 41a in the clutch housing 41, and relatively non-rotatably and axially movably carried at its inner peripheral portion at a front end of a sleeve 65 relatively rotatably fitted over an outer periphery of the output shaft 9. The sleeve 65 is connected to an inner rotor of the first hydraulic pump Pf and drives the first hydraulic pump Pf in operative association with the front wheels Wf, Wf.

The second cam member 63 of the torque cam mechanism 61 is a substantially annular member superposed on a front surface of the first cam member 62, and has an urging portion 66 protruding forwards from an outer periphery at a front end for urging the clutch plates 43 and 44 of the multi-plate clutch C forwards to bring them into engagement with one another. The second cam member 63 is supported for slipping movement with a predetermined torque relative to the clutch hub 42 by a frictional clutch 67 disposed between a spline 63b defined in an inner periphery of the second cam member 63 and the spline 42a in the clutch hub 42. A thrust bearing 68 is disposed between a front surface of the clutch piston 47 and a rear surface of the first cam member 62.

A cone member 69 extending from the second cam member 63 toward the inside of the clutch hub 42 includes a large number of small bores, and has a function to disperse a lubricating oil supplied through an oil passage 9a and oil bores 9b defined in the output shaft 9 by a centrifugal force to equally lubricate the clutch plates 43 and 44 of the multi-plate clutch C. In this case, the output shaft 9 may be a solid shaft, and an oil passage may be defined between the output shaft 9 and the sleeve 65, so that the lubricating oil is supplied through the cone member 69 to lubricate the clutch plates 43 and 44.

Figure 4A:
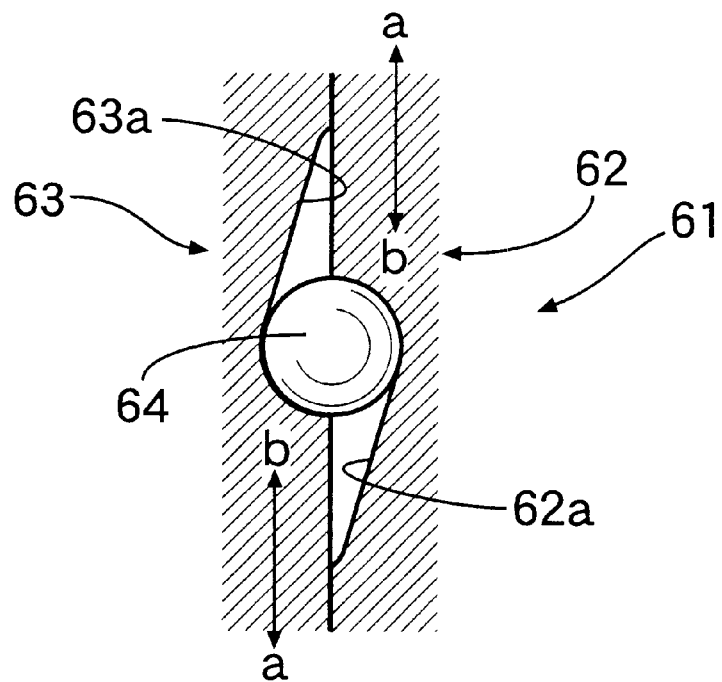
FIG. 4 is an enlarged sectional view taken along a line 4—4 in FIG. 3.
Figure 4B:
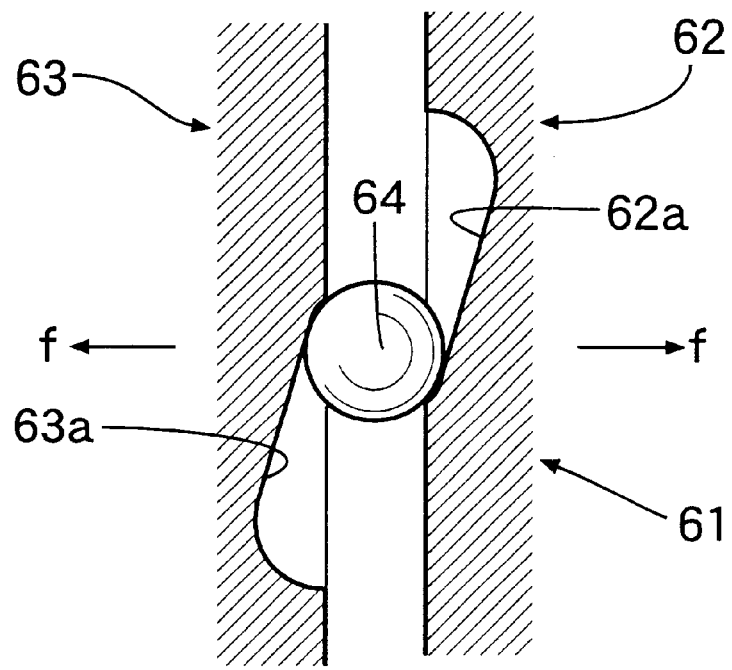

As can be seen from FIGS. 4A and 4B, six recesses 62a, 63a are defined at distances of 60° in each of opposed surfaces of the first and second cam members 62 and 63 of the torque cam mechanism 61, and the cam ball 64 is accommodated between each pair of the recesses 62a and 63a. The shape of each of the recesses 62a and 63a is such that a deeper portion accommodating half of the cam ball 64 and a portion gradually decreased in depth from the deeper portion are formed continuously to each other. Thus, when the first and second cam members 62 and 63 are in a phase relationship shown in FIG. 4A, they are close to each other with their opposed surfaces being in close contact with each other. When the first and second cam members 62 and 63 are rotated relative to each other in a direction of an arrow a from this state, they are moved relative to each other away from each other, as shown in FIG. 4B, by an axial thrust force f generated by an effect of the shapes of the recesses 62a and 63a.

When the first and second cam members 62 and 63 are in a phase relationship shown in FIG. 4A, even if they are intended to be rotated relative to each other in a direction of an arrow 12, the relative rotation of the first and second cam members 62 and 63 in the direction of the arrow b is limited by the effect of the shapes of the recesses 62a and 63a and hence, the axial thrust force f is not generated. Namely, the torque cam mechanism 61 also has a one-way cam function.

Figure 2:
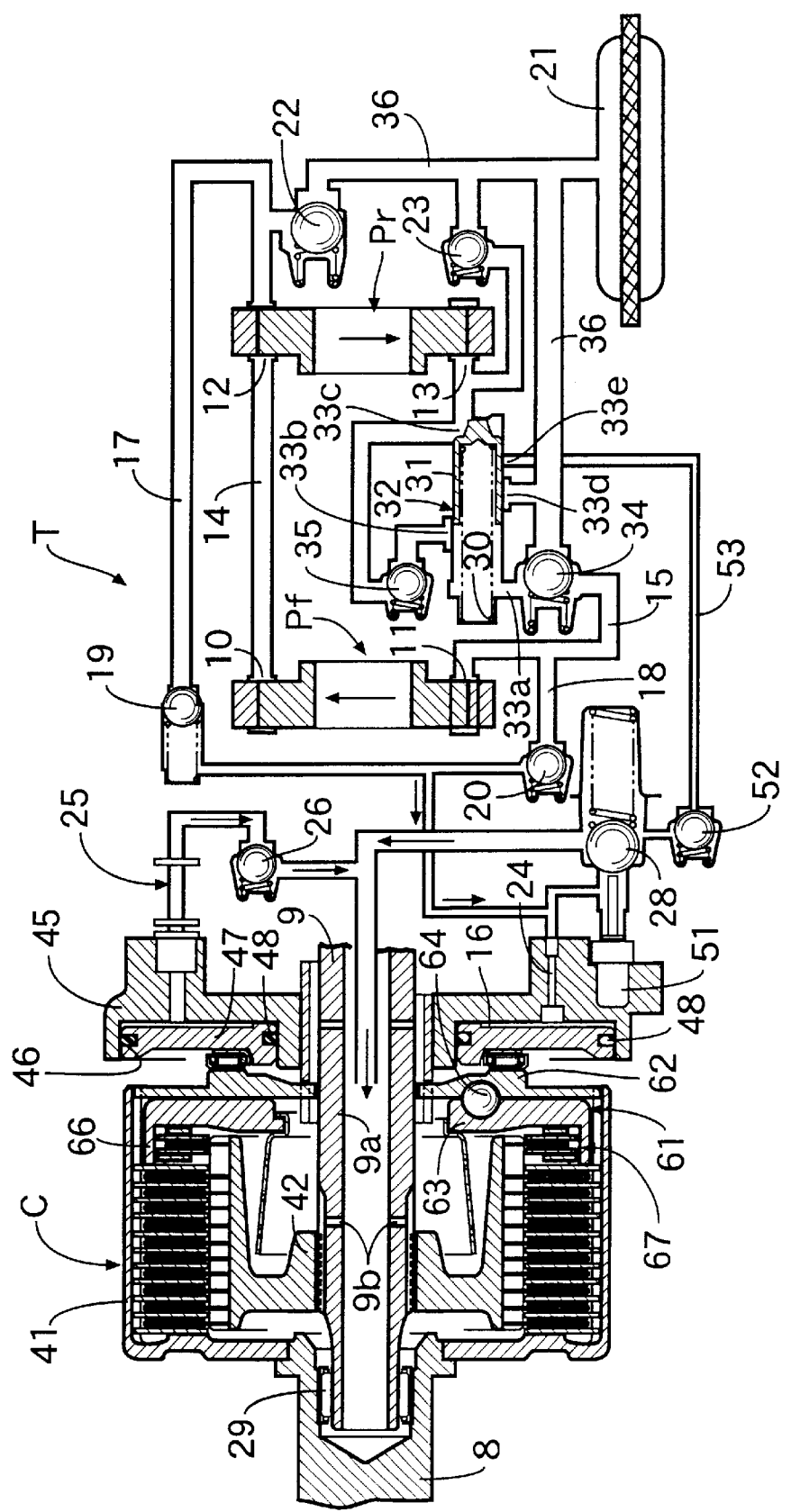
FIG. 2 is a view showing a multi-plate clutch and hydraulic pressure circuit in the four-wheel drive vehicle.
Figure 3:
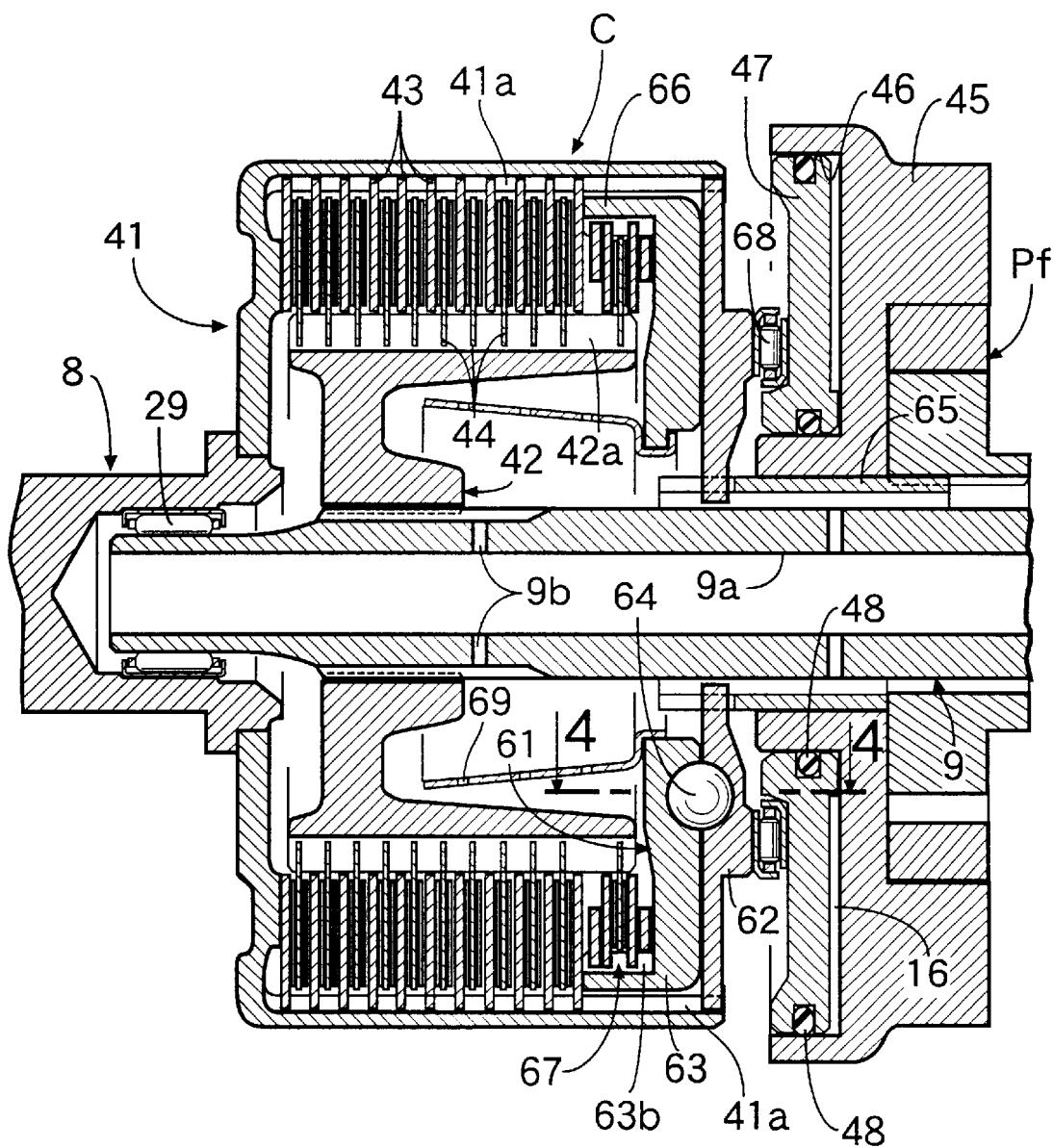
FIG. 3 is an enlarged sectional view of the multi-plate clutch.

As can be seen from FIG. 2, the working hydraulic pressure chamber 16 in the multiplate clutch C and the first connecting oil passage 14 are connected to each other through a third connecting oil passage 17, and the working hydraulic pressure chamber 16 and the second connecting oil passage 15 are connected to each other through a fourth connecting oil passage 18. A first one-way valve 19 is provided in the third connecting oil passage 17 for permitting only an oil flow from the second hydraulic pump Pr to the working hydraulic pressure chamber 16, and a second one-way valve 20 is provided in the fourth connecting oil passage 18 for permitting only an oil flow from the second connecting oil passage 15 to the working hydraulic pressure chamber 16. Provided in a fifth connecting oil passage 36 connecting an oil tank 21 with the first connecting oil passage 14 and the second connecting oil passage 15 are a third one-way valve 22 for permitting only an oil flow from the oil tank 21 to the first connecting oil passage 14, and a fourth one-way valve 23 for permitting only an oil flow from the oil tank 21 to a port 33c.

A choke-type constriction 24 is provided at a location upstream of the working hydraulic pressure chamber 16 in the multi-plate clutch C. An orifice-type constriction 25 and a first relief valve 26 are provided in series at locations downstream of the working hydraulic pressure chamber 16 and connected at a downstream location to the oil passage 9a defined in the output shaft 9. The oil passage 9a communicates with an area to be lubricated in the multi-plate clutch C, i.e., an internal space in the clutch housing 41 having the clutch plates 43 and 44 accommodated therein, through the plurality of oil bores 9b provided radially through the output shaft 9.

The first relief valve 26 has a function to prevent air from flowing backwards from the area to be lubricated in the multi-plate clutch C to the working hydraulic pressure chamber 16, when the clutch piston 47 of the multi-plate clutch C is swung by eccentric rotations of the input shaft 8 and the output shaft 9.

A second relief valve 28 is provided between a location upstream of the choke-type constriction 24 and a location downstream of the orifice-type constriction 25 for limiting an upper limit value for a hydraulic pressure transmitted to the working hydraulic pressure chamber 16. The second relief valve 28 is provided with a thermo-switch 51 for forcibly opening the second relief valve 28 upon an increase in oil temperature.

A spool valve 32 is provided in the second connecting oil passage 15 and comprises a spool 31 accommodated in a housing and biased rightwards by a spring 30. When the spool 31 is in a right position shown in FIG. 2, the communication between the port 33c and a port 33d is cut off, and a port 33a and a port 33b are in communication with each other. When the spool 31 is moved to a left position against a biasing force of the spring 30, the communication between the port 33a and the port 33b is cut off by the spool 31, and the port 33c and the port 33d are put into communication with each other. A fifth one-way valve 34 is provided between the port 33a and the port 33d for permitting only an oil flow from the port 33d to the port 33a, and a sixth one-way valve 35 is provided between the port 33b and the port 33c for permitting only an oil flow from the port 33b to the port 33c.

Therefore, during the forward movement of the vehicle, i.e., when the second hydraulic pump Pr is discharging the oil through the fourth port 13, the spool 31 is moved to the left position, whereby the second connecting oil passage 15 and the first connecting oil passage 14 are connected to each other by the communication between the port 33c and the port 33d. On the other hand, during the backward movement of the vehicle, when the first hydraulic pump Pf is discharging the oil through the second port 11, the spool 31 is in the right position shown in FIG. 2, whereby the second connecting oil passage 15 and the first connecting oil passage 14 are connected to each other by the communication between the port 33a and the port 33b.

When the spool 31 of the spool valve 32 is in the right position, a port 33e put out of communication with the port 33c by the spool 31 is in communication with the oil passage 9a in the output shaft 9 through a lubricating oil passage 53 provided in a seventh one-way valve 52.

The operation of the first embodiment of the present invention will be described below.

Upon the initiation of the forward movement of the vehicle, the driving force from the engine E is transmitted through the transmission 1, the differential 2 and the drive shafts 3, 3 to the front wheels Wf, Wf. The driving force is also transmitted from the differential 2 through the bevel gear device 4 and the input shaft 8 to the first hydraulic pump Pf to drive the first hydraulic pump Pf. At this time, the multi-plate clutch C is in a non-engaged state, and the second hydraulic pump Pr connected to the output shaft 9 is in a stopped state. Therefore, the oil drawn from the oil tank 21 through the fifth one-way valve 34 into the second port 11 in the first hydraulic pump Pf is discharged through the first port 10 into the first connecting oil passage 14. At this time, the third one-way valve 22 in the fifth connecting oil passage 36 is in a closed state and hence, the entire amount of oil discharged into the first connecting oil passage 14 flows into the third connecting oil passage 17, where the flowing of the oil is obstructed by the second one-way valve 20. Thus, the oil is supplied through the first one-way valve 19 and the choke-type constriction 24 into the working hydraulic pressure chamber 16 in the multi-plate clutch C.

When the multi-plate clutch C is brought into an engaged state in the above manner, the rear wheels Wr, Wr are driven through the output shaft 9, the bevel gear device 5, the differential 6 and the drive shafts 7, 7, and the second hydraulic pump Pr connected to the output shaft 9 is rotated. As a result, the oil discharged from the first hydraulic pump Pf is drawn into the second hydraulic pump Pr through the first connecting oil passage 14 in response to an increase in rotational speed of the rear wheels Wr, Wr, and the oil discharged from the second hydraulic pump Pr is drawn into the first hydraulic pump Pf through the ports 33c and 33d and the fifth one-way valve 34, while moving the spool 31 of the spool valve 32 leftwards against the biasing force of the spring 30. The hydraulic pressure applied to the working hydraulic pressure chamber 16 in the multi-plate clutch C, i.e., the engagement force of the multi-plate clutch C, is varied automatically in accordance with a difference between the amount of oil discharged from the first hydraulic pump Pf and the amount of oil drawn into the second hydraulic pump Pr. When the vehicle has reached, for example, a constant-speed forward-traveling state in which the difference between the rotational speeds of the front and rear wheels is substantially equal to 0 (zero), the hydraulic pressure is not applied to the working hydraulic pressure chamber 16 in the multi-plate clutch C, whereby the distribution of the torque to the rear wheels Wr, Wr is cut off. In the constant-speed forward-traveling state, the amount of oil discharged from the second hydraulic pump Pr is slightly greater than the amount of oil discharged from the first hydraulic pump Pf, as described above, but the oil discharged from the second hydraulic pump Pr acts to move the spool 31 of the spool valve 32 leftwards against the biasing force of the spring 30, and the surplus amount of oil discharged from the second hydraulic pump Pr is circulated through the ports 33c and 33d and the third one-way valve 22 in the fifth connecting oil passage 36 to the third port 12 in the second hydraulic pump Pr.

When the oil discharged from the first hydraulic pump Pf and the second hydraulic pump Pr is circulated through the first connecting oil passage 14 and the second connecting oil passage 15 in the above-described constant-speed forward-traveling state, a hydraulic pressure corresponding to the biasing force of the spring 30 is generated in the second connecting oil passage 15 between the fourth port 13 and the port 33c by moving the spool 31 of the spool valve 32 leftwards against the biasing force of the spring 30 by the oil discharged from the second hydraulic pump Pr. As a result, air drawn from a side-clearance in each of the hydraulic pumps Pf and Pr into the circulated oil is compressed by such hydraulic pressure and discharged sequentially through the side-clearance of the second hydraulic pump at a location closer to the fourth port 13 and hence, the air cannot be resident in the circulated oil. Thus, it is possible to reliably prevent a disadvantage produced when a difference is thereafter generated between rotational speeds of the front wheels Wf, Wf and the rear wheels Wr, Wr, whereby a difference is generated between the amounts of oil discharged from (or drawn into) the first and second hydraulic pumps Pf and Pr, the rise in hydraulic pressure is retarded due to the resident air and as a result, the responsiveness of the multi-plate clutch is reduced.

Now, when the difference has been generated between the amounts of oil discharged from (or drawn into) the first and second hydraulic pumps Pf and Pr, a hydraulic pressure corresponding to a preset load of the first relief valve 26 is applied immediately to the working hydraulic pressure chamber 16 in the multi-plate clutch C. After the first relief valve 26 has been opened, a hydraulic pressure determined by a difference between amounts of oil discharged from the first and second hydraulic pumps Pf and Pr, pressure drop characteristics of the orifice-type constriction 25 and the choke-type constriction 24, the viscosity of the oil or the like is applied to the working hydraulic pressure chamber 16 in the multi-plate clutch C. The upper limit value for such hydraulic pressure is limited by the preset load of the second relief valve 28 and hence, the upper limit value for the torque transmitted from the multi-plate clutch C can be regulated by properly setting the preset load of the second relief valve 28.

The amount of oil passing through the choke-type constriction 24 is influenced by the viscosity of the oil, so that when the viscosity of the oil in a low-temperature state is increased, the amount of flow through the choke-type constriction 24 is decreased and hence, the amount of oil passing through the working hydraulic pressure chamber 16 in the multiplate clutch C and the orifice-type constriction 25 is also decreased. At this time, the amount of drop in pressure generated across the orifice-type constriction 25 is proportional to the square of the amount of oil passed through the orifice-type constriction 25 and, hence, if the amount of oil passing through the orifice-type constriction 25 is decreased, the amount of drop in pressure in the orifice-type constriction 25 is decreased, and the amount of drop in pressure in the upstream choke-type constriction 25 is correspondingly increased. Thus, the hydraulic pressure applied to the working hydraulic pressure chamber 16 in the low-temperature state, i.e., the pressure resulting from the subtraction of the amount of drop in pressure produced by the choke-type constriction 24 from the pressure set by the second relief valve 28, is decreased. Therefore, even if the frictional coefficient is increased by an increase in viscosity of the oil, the urging force provided for the clutch plates 43 and 44 by the hydraulic pressure is correspondingly decreased and hence, an increase in engagement force of the multi-plate clutch C at a low temperature is prevented as a whole. On the other hand, in a high-temperature state, the viscosity of the oil is decreased, whereby the frictional coefficient is decreased. In this case, the amount of drop in pressure provided by the choke-type constriction 24 is decreased, and the hydraulic pressure applied to the working hydraulic pressure chamber 16 in the multi-plate clutch C is increased. Therefore, the urging force for the clutch plates 43 and 44 is correspondingly increased to prevent a decrease in engagement force of the multi-plate clutch C.

(1) The oil discharged from the working hydraulic pressure chamber 16 in the multi-plate clutch C through the orifice-type constriction 25 and the first relief valve 26 upon the start of the forward movement of the vehicle or during sudden acceleration of the vehicle moved forwards and (2) the oil discharged from an upstream position in the working hydraulic pressure chamber 16 through the second relief valve 28, are supplied through the oil passage 9a and the oil bores 9b in the output shaft 9 into the multi-plate clutch C, where the oil is scattered radially outwards from the oil bore in the cone member 69 rotated relative to the output shaft 9 by a centrifugal force to equally lubricate the clutch plates 43 and 44. The oil, which has lubricated the clutch plates 43 and 44, is circulated through an oil passage (not shown) to the oil tank 21.

During forward traveling of the vehicle at a constant speed, the pressure oil is not supplied to the working hydraulic pressure chamber 16 in the multi-plate clutch C, as described above, and hence, the lubricating oil is not supplied via the working hydraulic pressure chamber 16 to the area to be lubricated in the multi-plate clutch C. However, when the oil discharged from the fourth port 13 in the second hydraulic pump Pr moves the spool 31 of the spool valve 32 leftwards against the biasing force of the spring 30, a predetermined hydraulic pressure is generated and moreover, an excessive amount of the oil is discharged into the second connecting oil passage 15 by the difference between the amounts of oil discharged per rotation from the hydraulic pumps Pf and Pr. Therefore, a portion of the surplus oil is supplied through the lubricating oil passage 53 to the oil passage 9a in the output shaft 9 by a pressure generated upon opening of the spool valve 32, and is then supplied from the oil passage 9a through the oil bores 9b to the area to be lubricated in the multi-plate clutch C. In this manner, even during forward traveling of the vehicle at the constant speed with the multi-plate clutch C being in the non-engaged state, the lubricating oil can be supplied to the area to be lubricated in the multi-plate clutch C to effectively lubricate the clutch plates 43 and 44, thereby preventing the over-heating of the multi-plate clutch C.

The seventh one-way valve 52 provided in the lubricating oil passage 53 exhibits a function, which will be described below. When a negative pressure or vacuum is generated in the second connecting oil passage 15 upon the start of the forward movement of the vehicle or during sudden acceleration of the vehicle moved forwards, the air drawn from the area to be lubricated in the multi-plate clutch C can be prevented from being drawn into the first hydraulic pump Pf through the lubricating oil passage 53, the port 33e, the port 33d, the fifth one-way valve 34 and the second connecting oil passage 15.

When only the front wheels Wf, Wf have treaded on a road surface of a low frictional coefficient during forward traveling of the vehicle at a constant speed, or when a driver has attempted to suddenly accelerate the vehicle, the front wheels Wf, Wf may be brought into an excessively slipping state in some cases. In such a state, the amount of oil discharged from the first hydraulic pump Pf connected to the input shaft 8 is greater than the amount of oil drawn into the second hydraulic pump Pr connected to the output shaft 9, and the third one-way valve 22 is closed to cut off the communication between the first connecting oil passage 14 and the second connecting oil passage 15 through the fifth connecting oil passage 36. Therefore, the multi-plate clutch C is likewise brought into the engaged state to distribute the driving torque to the rear wheels Wr, Wr.

When a braking force is applied to the wheels, the front wheels Wf, Wf are locked earlier than the rear wheels Wr, Wr upon hard braking, because the distribution of the braking force to the front and rear wheels is generally set such that the braking force on the front wheels Wf, Wf is greater than that on the rear wheels Wr, Wr. An engine brake from the traveling of the vehicle at the constant speed is applied to only the front wheels Wf, Wf, and even in this case, the rotational speed of the front wheels Wf, Wf is transiently lower than that of the rear wheels Wr, Wr. In such a case, the amount of oil discharged from the second hydraulic pump Pr is greater than the amount of oil drawn into the first hydraulic pump Pf, and an excessive amount of the oil is discharged to the second connecting oil passage 15. Further, when the front wheels Wf, Wf have been locked completely, the operation of the first hydraulic pump Pf is stopped, and only the second hydraulic pump Pr is rotated and, hence, the total amount of oil discharged from the second hydraulic pump Pr is excessive. However, the excessive amount of the discharged oil is circulated through the port 33c and the port 33d in the spool valve 32 and the third one-way valve 22 in the fifth connecting oil passage 36 to the third port 12 in the second hydraulic pump Pr. Even if the rotational speed of the rear wheel Wr, Wr is greater than that of the front wheels Wf, Wf in the above manner, a hydraulic pressure based on a difference between the amounts of oil discharged from the first and second hydraulic pumps Pf and Pr is not applied to the working hydraulic pressure chamber 16 in the multi-plate clutch C. Therefore, the multi-plate clutch C is maintained in the non-engaged state to inhibit the transmission of the braking force from the front wheels Wf, Wf to the rear wheels Wr, Wr, whereby a variation in distribution of the braking force to the front and rear wheels cannot be produced.

During the above-described braking of the vehicle moved forwards, the multi-plate clutch C is not brought into the engaged state and, hence, the lubrication of the multi-plate clutch C by the oil passed through the first relief valve 26 is not carried out. However, as in the above-described forward movement of the vehicle at the constant speed, a portion of the oil discharged from the second hydraulic pump Pr is supplied to the multi-plate clutch C through the spool valve 32 and the lubricating oil passage 53, whereby the lubrication of the area to be lubricated in the multi-plate clutch C is carried out without hindrance.

During reverse movement of the vehicle, both of the rotational directions of the first and second hydraulic pumps Pf and Pr are inverted, thereby producing an inverse relationship between the discharge port and the intake port.

More specifically, when the rotational speed of the front wheels Wf, Wf is greater than that of the rear wheels Wr, Wr upon the start of the reverse movement of the vehicle or during sudden acceleration of the vehicle moving in reverse, the amount of oil discharged from the first hydraulic pump Pf is greater than the amount of oil drawn into the second hydraulic pump Pr and, hence, a hydraulic pressure is produced in the second connecting oil passage 15. At this time, the spool 31 of the spool valve 32 is retained at a shown position under the action of the biasing force of the spring 30, and the oil discharged into the second connecting oil passage 15 by means of the difference between the amount of oil discharged from the second port 11 in the first hydraulic pump Pf and the amount of oil drawn into the second hydraulic pump Pr through the fourth port 13 is inhibited from flowing into the fifth connecting oil passage 36 by the fourth one-way valve 23 and the fifth one-way valve 34, and is permitted to flow into the fourth connecting oil passage 18, as described above, where the oil passes through the second one-way valve 20, and is then supplied to the working hydraulic pressure chamber 16 in the multi-plate clutch C in such a manner that the flow of the oil is inhibited by the first one-way valve 19. This causes the multi-plate clutch C to be brought into the engaged state in order to distribute the driving torque to the rear wheels Wr, Wr. When the rotational speed of the rear wheels Wr, Wr and as a result, the vehicle is brought into a constant-speed reverse-traveling state, the rotational speeds of the first and second hydraulic pumps Pf and Pr become equal to each other. However, the amount of oil discharged per rotation from the second hydraulic pump Pr is greater than the amount of oil discharged per rotation from the first hydraulic pump Pf and, hence, an amount of the oil corresponding to a difference between such amounts of oil discharged is supplied to the first connecting oil passage 14. As a result, during reverse movement of the vehicle, the torque is distributed from the front wheels Wf, Wf to the rear wheels Wr, Wr even in the constant-speed traveling state of the vehicle.

In this constant-speed, reverse-traveling state, the load provided by the spring 30 of the spool valve 32 is not applied to the oil circulating through a circulation oil passageway comprising the first and second connecting oil passages 14 and 15. However, the constant-speed, reverse-traveling state cannot be generally continued for a long time and hence, the drawing of air from the side-clearances of the rotors of the hydraulic pumps Pf and Pr and the stoppage of the supplying of the lubricating oil to the multi-plate clutch C are substantially not problematic.

During braking of the vehicle moving in reverse, the rotational speed of the first hydraulic pump Pf is less than that of the second hydraulic pump Pr and hence, a hydraulic pressure is generated by means of a difference between the amount of oil discharged from the second hydraulic pump Pr through the third port 12 and the amount of oil drawn into the first hydraulic pump Pf through the first port 10. At this time, the third one-way valve 22 is closed and, hence, the multi-plate clutch C is brought into the engaged state through the first one-way valve 19 in the third connecting oil passage 17, whereby the braking force for the front wheels Wf, Wf is transmitted to the rear wheels Wr, Wr.

During the above-described reverse movement of the vehicle, the second port 11 in the first hydraulic pump Pf serves as a discharge port, and the fourth port 13 in the second hydraulic pump Pr serves as an intake port. Therefore, the spool 31 of the spool valve 32 is always retained at a shown right position. Even when the spool 31 is locked at a left position for any reason at that time, the pressure of oil discharged from the fist hydraulic pump Pf through the second port 11 is obstructed by the fifth one-way valve 34 and. applied to the port 33a in the spool valve 32, whereby the locked spool is pushed back to the right position, which is a normal position. At this time, even when the locking of the spool 31 is not released, the hydraulic pressure in the second connecting oil passage 15 escapes from the second relief valve 28 through the fourth connecting oil passage 18 and, hence, an excessive load cannot be applied to the first hydraulic pump Pf.

The above-described engagement of the multi-plate clutch is performed by advancing the clutch piston 47 by the oil supplied to the working hydraulic pressure chamber 16 and by urging the clutch plates 43 and 44 by the urging portion of the second cam member 63 of the torque cam mechanism 61 urged axially trough the needle bearing 68. At this time, the torque cam mechanism 61 interposed between the clutch piston 47 and the clutch plates 43 and 44 exhibits a function which will be described below.

Figure 5:
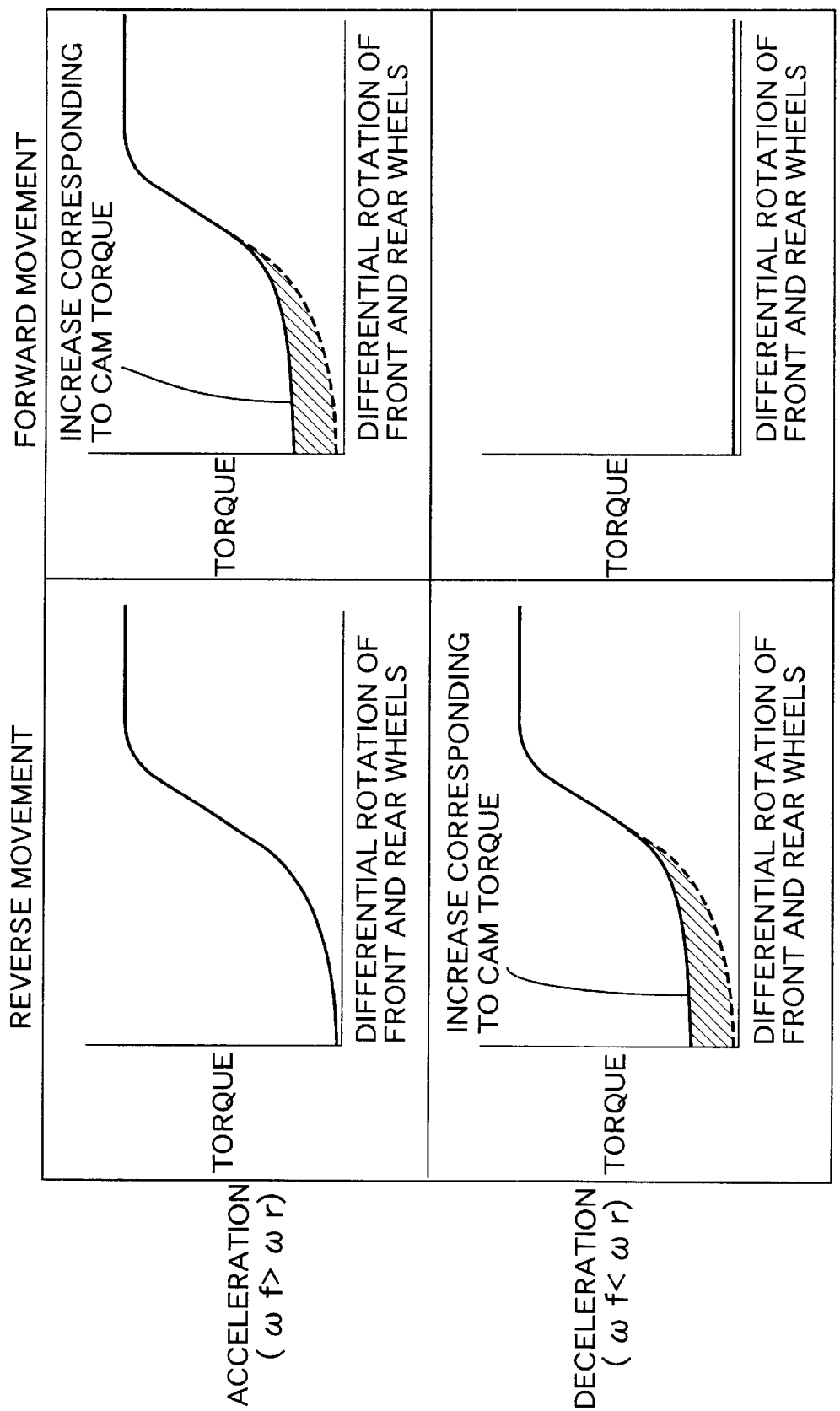
FIG. 5 is a graph for explaining the operation.

As described for explaining the structure of the hydraulic pressure circuit, and as also shown in FIG. 5, the multi-plate clutch C is brought into the engaged state during acceleration of the vehicle moved forwards, during acceleration of the vehicle moving in reverse and during deceleration of the vehicle moving in reverse, whereby the transmission of the torque is carried out between the front wheels Wf, Wf and the rear wheels Wr, Wr. Only during deceleration of the vehicle moved forwards, the multi-plate clutch C is not brought into the engaged state, whereby the transmission of the torque is not carried out between the front wheels Wf, Wf and the rear wheels Wr, Wr. As described above, the torque cam mechanism 61 also has the function as the one-way cam and during acceleration of the vehicle moved forwards, the first cam member 62 and the second cam member 63 of the torque cam mechanism 61 are rotated relative to each other from the state shown in FIG. 4A to the state shown in FIG. 4B to generate a thrust force f for bringing the multi-plate clutch C into the engaged state. Therefore, as shown in a right and upper portion of FIG. 5, the torque cam mechanism 61 can be operated at an initial stage of the acceleration of the vehicle moved forwards occurring with a high frequency during traveling of the vehicle to assist in the engagement of the multi-plate clutch C performed the hydraulic pressure, thereby enhancing the responsiveness for bringing the vehicle into a four-wheel drive mode.

Moreover, the engagement force generated in the multi-plate clutch C by the torque cam mechanism 61 is gradually decreased in accordance with an increase in engagement force generated in the multi-plate clutch C by the hydraulic pressure. Therefore, it is possible to prevent the multi-plate clutch C from being brought into the engaged state only by the torque cam mechanism 61 to avoid the occurrence of the differential locking.

As shown in a right and lower portion of FIG. 5, during the deceleration of the vehicle moving forwards, the engagement of the multi-plate clutch C by the hydraulic pressure is not performed and moreover, the directions of relative rotation of the first and second cam members 62 and 63 are inverted, and hence, the thrust force f for the torque cam mechanism 61 to bring the multi-plate clutch C into the engaged state by the function of the one-way cam cannot be generated. Therefore, during the deceleration of the vehicle moving forwards, the vehicle is maintained in a two-wheel drive mode to avoid the interference with an ABS system, thereby ensuring the braking performance of the vehicle.

As shown in a left and upper portion of FIG. 5, during the acceleration of the vehicle moving in reverse the engagement of the multi-plate clutch C by the hydraulic pressure is performed, but the thrust force f for the torque cam mechanism 61 to bring the multi-plate clutch C into the engaged state by the function of the one-way cam cannot be generated.

As shown in a left and lower portion of FIG. 5, during the deceleration of the vehicle moving in reverse, the engagement of the multi-plate clutch C by the hydraulic pressure is performed, and the thrust force f for the torque cam mechanism 61 to bring the multi-plate clutch C into the engaged state by the function of the one-way cam is generated, leading to a state in which the thrust force of the torque cam mechanism 61 assists in the engagement of the multi-plate clutch C by the hydraulic pressure.

Thus, at the initial stage of the acceleration of the vehicle moved forwards actually occurring with a high frequency, the multi-plate clutch C can be brought into the engaged state by both of the torque cam mechanism 61 and the hydraulic pressure, thereby enhancing the responsiveness for bringing the vehicle into the four-wheel drive mode and distributing the sufficient driving force to the rear wheels Wr, Wr. Likewise, during the deceleration of the vehicle moving forwards actually occurring at a high frequency, the vehicle can be maintained in the two-wheel drive mode to avoid interference with the ABS system.

Even after the torque cam mechanism 61 has been operated to provide the state shown in FIG. 4B, thereby inhibiting the relative rotations of the first and second cam members 62 and 63, the relative rotations of the front wheels Wf, Wf and the rear wheels Wr, Wr are continued. However, the frictional clutch 67 is slipped to permit the relative rotations of the clutch hub 42 and the second cam member 63 and hence, an excessive load cannot be applied to the torque cam mechanism 61.

Figure 6:
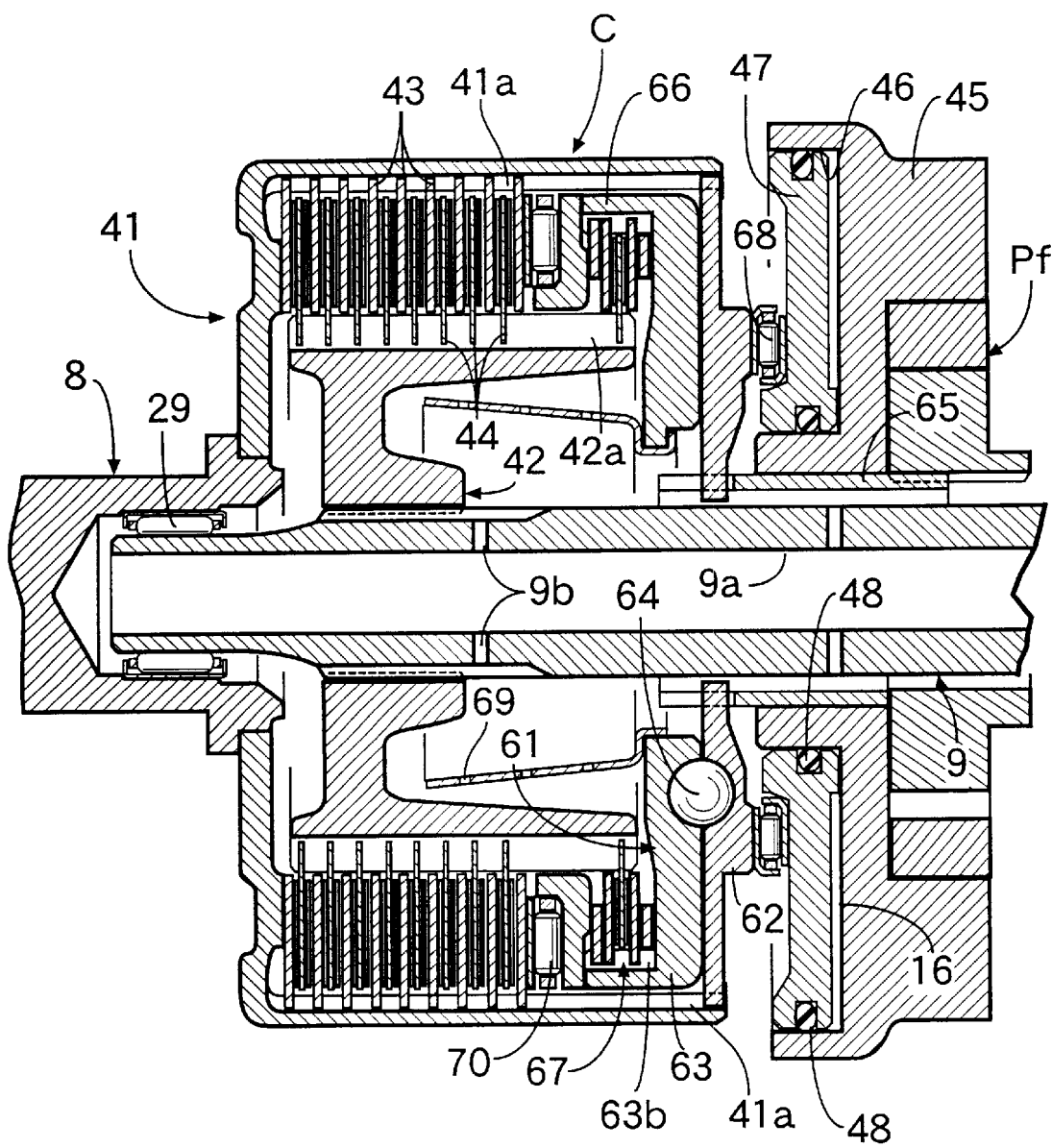
FIG. 6 is a view similar to FIG. 3 but according to a second embodiment of the present invention.

A second embodiment of the present invention will now be described with reference to FIG. 6.

In the structure of the first embodiment, after the torque cam mechanism 61 has been operated to provide the state shown in FIG. 4B, thereby inhibiting the relative rotations of the first and second cam members 62 and 63, the rear-end clutch plate 43 continued to be rotated along with the clutch housing 41 and the urging portion 66 of the second cam member 63 are slid on each other. For this reason, there is a possibility that a friction and/or a strange noise may be generated.

Therefore, in the second embodiment, a thrust bearing 70 is disposed between the rear-end clutch plate 43 and the urging portion 66 of the second cam member 63, whereby the generation of a friction and/or abnormal noise can be prevented.

Figure 7:
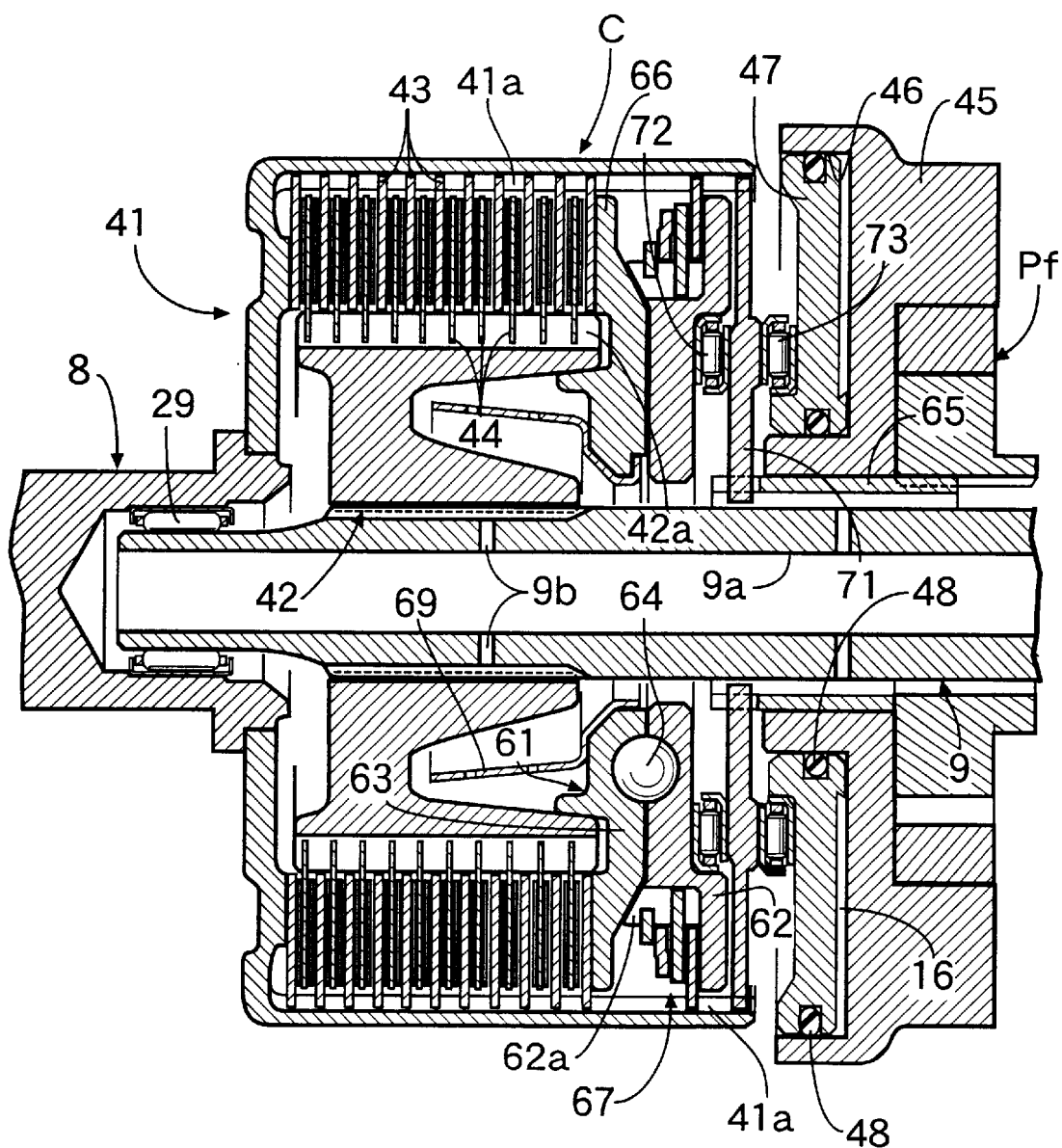
FIG. 7 is a view similar to FIG. 3 but according to a third embodiment of the present invention.

A third embodiment of the present invention will be described below with reference to FIG. 7.

In a torque cam mechanism 61 in the third embodiment, a second cam member 63 is axially movably and relatively non-rotatably carried in the spline 42a of the clutch hub 42, while a frictional clutch 67 is disposed between a spline 62a of a first cam member 62 and the spline 41a of the clutch housing 41. The frictional clutch 67 is designed, so that it is slipped, when a torque greater than a predetermined value is applied between the first cam member 62 and the clutch housing 41.

An end plate 71 is axially movably and relatively non-rotatably carried in the rear of the torque cam mechanism 61 between the spline 41a of the clutch housing 41 and the sleeve 65 connected to the first hydraulic pump Pf. A thrust bearing 72 is disposed between a front surface of the end plate 71 and a rear surface of the first cam member 62, and a thrust bearing 73 is disposed between a rear surface of the end plate 71 and a front surface of the clutch piston 47.

With the above arrangement, when relative rotations occur between the front wheels Wf, Wf and the rear wheels Wr, Wr to operate the torque cam mechanism 61, the multi-plate clutch C is brought into its engaged state by a thrust force f generated by the relative rotations of the first and second cam members 62 and 63. Even after the relative rotations of the first and second cam members 62 and 63 have been limited, the relative rotations of the front wheels Wf, Wf and the rear wheels Wr, Wr are continued, but the frictional clutch 67 is slipped to permit the relative rotations of the clutch housing 41 and the first cam member 62 and to permit relative rotations of the end plate 71 rotated in unison with the clutch housing 41 and the first cam member 62 rotated in unison with the clutch hub 42 by the action of the thrust bearing 72. The thrust bearing 73 disposed between the clutch piston 47 and the end plate 71 permits the rotation of the end plate 71 relative to the clutch piston 47 which is not rotated relative to the housing 45.

With the third embodiment, upon operation of the torque cam mechanism 61, only the second cam member 63 is moved axially with the first cam member 62 being in its axially stopped state, thereby bringing the multi-plate clutch C into the engaged state. Therefore, it is possible to prevent the frictional clutch 67 carried on the first cam member 62 from being axially moved to contribute to the alleviation of the friction. The relative rotations of the end plate 71 rotated in unison with the clutch housing 41 and the first cam member 62 rotated in unison with the clutch hub 42 are permitted by the action of the thrust bearing 72. However, the rotational speed of the thrust bearing 72 in the third embodiment can be reduced to enhance the durability, because the thrust bearing 72 is mounted at a location radially inward from the thrust bearing 70 (mounted at the tip end of the urging portion 66 of the second cam member 63 in FIG. 6) in the second embodiment, namely, at a radially intermediate location on the end plate 71.

Although the embodiments of the present invention have been described in detail, it will be understood that the present invention is not limited to the above-described embodiments, and various modifications may be made without departing from the subject matter of the invention.

For example, in the various embodiments, the clutch housing has been illustrated as a member rotated in operative association with the front wheels Wf, Wf, and the clutch hub 42 has been illustrated as a member rotated in operative association with the rear wheels Wr, Wr. Alternatively, a member other than the clutch housing 41 and the clutch hub 42 may be employed.

What is claimed is:

1. A power transmitting system for a four-wheel drive vehicle including front wheels to which a driving force from an engine is transmitted directly, and rear wheels to which a portion of the driving force from the engine is transmitted indirectly through a multi-plate clutch, said multi-plate clutch being brought into its engaged state by a hydraulic pressure generated by hydraulic pumps in accordance with a difference between rotational speeds of the front wheels and the rear wheels, said power transmitting system comprising:

a torque cam mechanism including a first cam member operated in operative association with the rotation of the front wheels, and a second cam member operated in operative association with the rotation of the rear wheels, said multi-plate clutch being brought into the engaged state by an axial thrust force generated in accordance with a difference between the rotational speeds of said cam members, said torque cam mechanism being arranged so that when the rotational speed of the front wheels is greater than that of the rear wheels during forward traveling of the vehicle, the thrust force is generated, and when the rotational speed of the rear wheels is greater than that of the front wheels during forward traveling of the vehicle, the thrust force is not generated.

2. A power transmitting system for a four-wheel drive vehicle according to claim 1, wherein one of said first cam member and said second cam member is connected through a frictional clutch to a member rotated in operative association with one of the front wheels and the rear wheels.

3. A power transmitting system for a four-wheel drive vehicle according to claim 2, wherein the member rotated in operative association with the front wheels and said first cam member are connected to each other through said frictional clutch, and said second cam member is fixed to the member rotated in operative association with the rear wheels, the hydraulic pressure generated by the hydraulic pumps urging the entire torque cam mechanism axially through an end plate to bring said multi-plate clutch into the engaged state, said power transmitting system further comprising:

a thrust bearing disposed between said end plate and said first cam member at a location radially inward from an urging portion of said second cam member for urging said multi-plate clutch.

* * * * *